United States Patent
Van Der Putten et al.

(10) Patent No.: US 7,372,930 B2
(45) Date of Patent: *May 13, 2008

(54) METHOD TO SYNCHRONIZE DATA AND A TRANSMITTER AND A RECEIVER REALIZING SAID METHOD

(75) Inventors: Frank Van Der Putten, Leest (BE); Paul Marie Pierre Spruyt, Heverlee (BE); Karel August Catharina Adriaensen, Kontich (BE)

(73) Assignee: Alcatel Alsthom (BE)

( * ) Notice: Subject to any disclaimer, the term of this patent is extended or adjusted under 35 U.S.C. 154(b) by 11 days.

This patent is subject to a terminal disclaimer.

(21) Appl. No.: 11/026,258

(22) Filed: Dec. 30, 2004

(65) Prior Publication Data

US 2005/0169413 A1 Aug. 4, 2005

(51) Int. Cl.
*H04L 7/00* (2006.01)
(52) U.S. Cl. .................. 375/358; 375/354; 375/316; 375/295
(58) Field of Classification Search .............. 375/219, 375/222, 295, 316, 354, 358; 370/395–396; 455/68–70
See application file for complete search history.

(56) References Cited

U.S. PATENT DOCUMENTS

| | | | | |
|---|---|---|---|---|
| 4,736,371 A * | 4/1988 | Tejima et al. | | 370/236 |
| 4,763,103 A | 8/1988 | Galula et al. | | |
| 5,003,558 A | 3/1991 | Gregg | | |
| 5,239,545 A * | 8/1993 | Buchholz | | 370/348 |
| 5,299,199 A * | 3/1994 | Wilson et al. | | 370/347 |
| 5,303,234 A * | 4/1994 | Kou | | 370/442 |
| 5,420,864 A * | 5/1995 | Dahlin et al. | | 370/347 |
| 5,430,724 A | 7/1995 | Fall et al. | | |
| 5,434,892 A | 7/1995 | Dike et al. | | |
| 5,513,321 A * | 4/1996 | Katori | | 709/234 |
| 5,539,743 A * | 7/1996 | Amemiya et al. | | 370/461 |
| 5,594,738 A * | 1/1997 | Crisler et al. | | 370/347 |
| 5,625,651 A | 4/1997 | Cioffi | | |
| 5,729,541 A * | 3/1998 | Hamalainen et al. | | 370/337 |
| 5,761,197 A * | 6/1998 | Takefman | | 370/337 |
| 5,787,114 A | 7/1998 | Ramamurthy et al. | | |
| 5,790,551 A * | 8/1998 | Chan | | 370/458 |
| 5,835,234 A * | 11/1998 | Takaki | | 358/404 |
| 5,881,065 A * | 3/1999 | Abiru | | 370/413 |
| 5,894,476 A | 4/1999 | Fraser | | |
| 5,898,744 A | 4/1999 | Kimbrow et al. | | |

(Continued)

FOREIGN PATENT DOCUMENTS

DE 4225407 2/1994

OTHER PUBLICATIONS

"Interfaces, framing and bitrates for ATM over ADSL" by Paul Spruyt et al, Standards Project T1E1.4: ADSL, Apr. 22-25, 1996, Colorado Springs, CO.

*Primary Examiner*—Jean B. Corrielus

(57) ABSTRACT

A method to realize synchronization of data (DAT) sent from a transmitter (TX) to the receiver (RX), with a signal (SIG) available in the receiver (RX). The method includes the following steps: in the receiver (RX) generating trigger signals (T) from the signal (SIG); sending the trigger signals (T) from the receiver (RX) to the transmitter (TX); and upon receipt of the trigger signals (T) by the transmitter (TX) sending the data (DAT) from the transmitter (TX) to the receiver (RX).

21 Claims, 1 Drawing Sheet

U.S. PATENT DOCUMENTS

| | | | |
|---|---|---|---|
| 5,966,409 A | 10/1999 | Maeda | |
| 6,104,724 A * | 8/2000 | Upp | 370/458 |
| 6,130,886 A * | 10/2000 | Ketseoglou et al. | 370/347 |
| 2003/0206530 A1* | 11/2003 | Lindsay et al. | 370/277 |

* cited by examiner

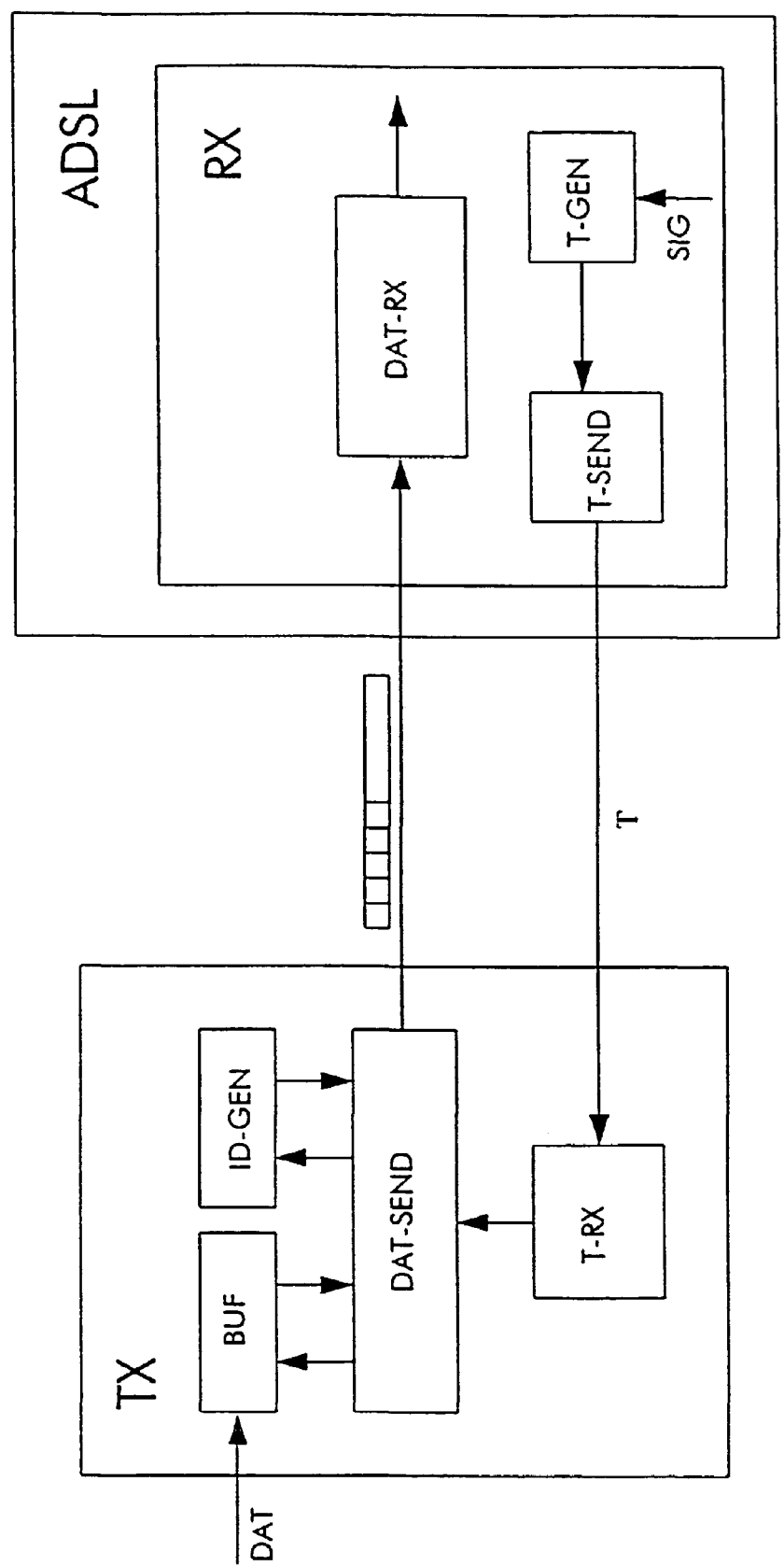

METHOD TO SYNCHRONIZE DATA AND A TRANSMITTER AND A RECEIVER REALIZING SAID METHOD

PRIORITY AND CROSS-REFERENCE TO RELATED APPLICATION

This application claims priority from the following: EPO Ser. No. 96402393.1 filed Nov. 8, 1996; U.S. Provisional Ser. No. 60/052,126 filed Jul. 10, 1997; U.S. patent application Ser. No. 08/965,136 filed Nov. 6, 1997, now U.S. Pat. No. 5,903,612; and U.S. patent application Ser. No. 09/280,435 filed Mar. 29, 1999, now U.S. Pat. No. 6,845,136.

BACKGROUND OF THE INVENTION

1. Technical Field

The present invention relates to a method to synchronize data, and a transmitter and a receiver realizing said method.

2. Discussion of Related Art

Such a method to synchronize data is common knowledge. Indeed, e.g., in communication systems where data is sent from a transmitter to a receiver, for the receiver to be able to interpret the received data, the received data have to be synchronized in the receiver with a reference signal, usually a clock signal of the receiver. Realizing synchronization implies more complexity and therefore there is a need for additional hardware of software in the receiver. The trade-offs are generally between expense and complexity, on the one hand, and error performance on the other hand. However, some kind of receivers, e.g., receivers using asymmetric digital subscriber line technology are required to have both, a low complexity and also a low error performance.

SUMMARY OF THE INVENTION

An object of the present invention is to provide a method to synchronize data and a transmitter and a receiver realizing said method of the above known type but which are suited for use in communication systems where a low complexity and a low error performance are required at the receiving side of the communication system.

According to the invention, this object is achieved by the method to synchronise data as described in claim 1, and the transmitter and the receiver realizing the method.

Indeed, due to the trigger signals generated from the signal available in the receiver and sent to the transmitter, the transmitter is able to send the data to the receiver upon receipt of the trigger signals, i.e., at the right time to ensure synchronization between the data received in the receiver and the available signal, e.g., a clock signal in the receiver. In this way, the complexity of the synchronization process is moved from the receiver side to the transmitter side of the communication system and each level of synchronization can be realized with the required level of error performance and without making the receiver too complex.

Another characteristic feature of the present invention is that the data, sent from the transmitter to the receiver, is asynchronous data. Indeed, upon receipt of the trigger signals, the transmitter must be able to send data even if the trigger signals are sent in an asynchronous way. This is for instance the case when the receiver has to receive the data at a time moment at which the data has to just fit at a predefined place in a frame. In this way frame synchronization is achieved.

Yet another characteristic feature of the present invention is that in the even that no data is available in the transmitter to be sent upon receipt of the trigger signals, the transmitter is able to generate idle data and to send this idle data to the receiver. In this way, e.g., the frame synchronization process is not disturbed.

An important application of the present invention is that the receiver is included in an asymmetric digital subscriber line (ADSL) modem. In such a receiver, the received data is framed into an asymmetric digital subscriber line frame and sent over a twisted pair. However in known ADSL modems using the known synchronization methods, when the modem receives data at a higher frequency than the frequency at which the data is sent, the data has to be buffered before being framed. As already mentioned above, it is important to keep the complexity of a receiver in such a modem low. By using the method of the invention, the asymmetric digital subscriber line modem gets rid of, i.e., avoids, the buffering aspect. In fact, the buffering is again moved from the receiver to the transmitter which now must be able to buffer the data until it receives a trigger signal of the receiver to have the permission to send the data to the receiver. Therefore, this way of synchronizing is especially suited for systems wherein there is anyway buffering foreseen at the transmitting side, e.g., for Asynchronous Transmission Mode (ATM) systems.

BRIEF DESCRIPTION OF THE DRAWING

The above-mentioned and other objects and features of the invention will become more apparent and the invention itself will be best understood by referring to the following description of an embodiment taken in conjunction with the accompanying sole FIGURE which is a schematic block diagram of a synchronization system including a transmitter and a receiver realizing the method of the invention.

DETAILED DESCRIPTION OF THE INVENTION

Referring to the FIGURE, the working of the synchronization system will be described. First, the working of the synchronization system will be explained by means of a functional description of the blocks shown in the FIGURE. Based on this description, implementation of the functional blocks will be obvious to any person skilled in the art and will therefore not be described in detail. In addition, the principle working of the synchronization system will be described in further detail.

The synchronization system includes a transmitter TX and an asymmetric digital subscriber line modem (ADSL modem) ADSL.

The transmitter TX includes four functional blocks:
 a buffer BUF;
 an idle data generating means ID-GEN;
 a data sending means DAT-SEND; and
 a trigger receiving means T-RX.

The buffer BUF is included to buffer the data DAT presented to the transmitter TX. This data DAT can be digital data of any kind, however, for this embodiment the data DAT is asynchronous data, i.e., data organized following the asynchronous transfer mode (ATM) technique. As mentioned, the buffer BUF buffers the data DAT presented to the transmitter TX. However, it has to be understood that the buffer BUF will only do this when it is necessary, i.e., when the transmitter receives more data DAT than it is allowed to send.

The idle data generating means ID-GEN is included to generate idle data. It has to be remarked that this is provided to enable the use of one of the typical ATM functionalities. Idle data is sent whenever there is no information available at the side of the sender at the moment of transmission. This allows a fully asynchronous operation of both sender and receiver.

The data sending means DAT-SEND is included to send data from the transmitter TX to the ADSL modem. This data can be useful user information i.e. the data DAT coming from the buffer BUF or idle data, coming from the idle data generating means ID-GEN.

The trigger receiving means T-RX is included to receive trigger signals T coming from the ADSL modem. Upon receipt of such a trigger signal, the data sending means DAT-SEND is in turn triggered by the trigger receiving means T-RX and is allowed to send data.

The ADSL modem includes besides a receiver RX also the characteristic functional blocks of an ADSL modem. Since the description of the ADSL technology goes beyond the scope of this invention, these functional blocks are not shown in the FIGURE. However, it is worth mentioning here that one of the functional clocks of such an ADSL modem is a framer which organizes overhead information and user information, i.e., the incoming data DAT into ADSL frames, i.e., uniformly sized groups of bits used to organize the ADSL data stream.

The receiver RX includes three functional blocks:
trigger generating means T-GEN;
trigger sending means T-SEND; and
data receiving means DAT-RX.

The trigger generating means T-GEN is included to generate trigger signals T from an available signal SIG in the receiver RX. This available signal SIG is generated in accordance with the time moments whenever data DAT is needed to fit into an available ADSL frame in a predetermined place. This signal SIG is not necessarily a clock signal. Indeed, looking to the form of an ADSL frame, the whole frame need not be filled with data DAT, so as a consequence, the signal SIG is not a signal with a constant frequency.

It has to be remarked here that the trigger signals T are allowed to be of any kind, e.g., one single bit pulse or a predefined codeword as long as the trigger generating means T-GEN of the receiver RX and the trigger receiving means T-RX of the transmitter T can recognize the trigger signals T.

The trigger sending means T-SEND is included to send the trigger signals T from the receiver RX to the transmitter TX and the data receiving means DAT-RX is included to receive the data DAT coming from the transmitter TX.

The transmission medium for sending the trigger signals is in the FIGURE depicted as a separate line to simplify the description of the working of the system. However, these signals can (and usually are) transmitted over the same transmission medium, i.e., a single twisted wire pair, as the data.

The principle working of the synchronization system will be described in the following paragraph.

Whenever data DAT is needed to fit in an available ADSL frame in a predetermined place, a trigger signal T is generated from the available signal SIG and transmitted to the transmitter TX. Upon receipt of a trigger signal T the trigger receiving means T-RX gives a signal to the data sending means DAT-SEND, e.g., by means of a control signal, and DAT-SEND in turn makes a signal request for data DAT to the buffer BUF. When there is data DAT available in the buffer BUF, the data DAT is provided to the data sending means DAT-SEND. However, when no data DAT is available in the buffer, the synchronization process may not be disturbed and the data sending means DAT-SEND requests idle data to the idle data generating means ID-GEN. The data, either user data or idle data, is sent to the receiver RX and arrives there at the right moment to fit immediately into the ADSL frame in the predetermined place whereby synchronization is established between the data DAT and the available signal SIG.

It has to be remarked that upon receipt of a trigger signal T, the transmitter TX has to send data DAT to the receiver RX. Sending data can be done immediately after receiving of the trigger signal T, however the invention is not restricted to such kind of synchronization systems but is also applicable for synchronization systems where the data DAT is only sent after a predetermined period. Indeed, in this particular embodiment, the total period between the moment of generating a particular trigger and the moment of data DAT arriving at the receiver RX to accordingly fit into a predefined ADSL frame must be taken into account at initialization time. It can be necessary to have a predetermined waiting period somewhere in the loop in order to be able to realize the synchronization. Since the complexity is moved from the receiver RX to the transmitter TX, this waiting period will also be realized by the transmitter TX.

It has to be remarked that due to the cell structure of the ATM data stream whenever idle data, not corresponding to a complete idle cell has been sent, that upon receipt of subsequent trigger signals T idle data has to be sent until the complete idle cell is transmitted, even if in the mean time some data DAT becomes available in the buffer BUF.

While the principles of the invention have been described above in connection with specific apparatus, it is to be clearly understood that this description is made only by way of example and not as a limitation on the scope of the invention.

The invention claimed is:

1. A method for synchronizing the insertion of data from a transmitting entity into a digital data stream realized in a receiving entity, comprising the steps of:

identifying by said receiving entity in said digital data stream, without a request from the transmitting entity, time moments when there is availability to insert said data into said digital data stream;

generating by said receiving entity at least one signal to indicate to said transmitting entity the time moments when said data fits into an available place in said digital data stream;

sending said at least one signal to said transmitting entity by said receiving entity;

receiving said at least one signal by said transmitting entity; and sending said data from said transmitting entity to said receiving entity after a predetermined time period, wherein said data is synchronized in said available place in said data stream.

2. The method for synchronizing the insertion of data according to claim 1, wherein said data stream is an ADSL data stream.

3. The method for synchronizing the insertion of data according to claim 1, wherein said transmitting entity is an asynchronous transfer mode transmitting entity.

4. The method for synchronizing the insertion of data according to claim 1, wherein said predetermined time period is a waiting period realized in said transmitting entity.

5. The method for synchronizing the insertion of data according to claim 1, wherein said predetermined time period is substantially immediately after receipt of said at least one signal.

6. The method for synchronizing the insertion of data according to claim 1, wherein said at least one signal is a coded sequence of bits.

7. The method for synchronizing the insertion of data according to claim 1, wherein said at least one signal is only one signal which is needed to trigger said transmitting entity to send said data.

8. A transmitting entity for synchronizing the insertion of data into a digital data stream realized in a receiving entity, said transmitting entity comprises:

a signal receiving entity configured to receive from the receiving entity, without a request from the transmitting entity, at least one signal to trigger sending of data after a predetermined time period for insertion into the digital data stream, wherein said at least one signal is generated by the receiving entity without the request from the transmitting entity by identifying time moments when said data fits into an available place in said digital data stream; and a data sending entity configured, after being triggered by said at least one signal, to send said data from said transmitting entity to the receiving entity in the digital data stream after the predetermined time period, wherein said data is synchronized for receipt in a predetermined place in said digital data stream.

9. The transmitting entity for synchronizing the insertion of data according to claim 8, wherein said data stream is an ADSL data stream.

10. The transmitting entity for synchronizing the insertion of data according to claim 8, wherein said transmitting entity is an asynchronous transfer mode transmitting entity.

11. The transmitting entity for synchronizing the insertion of data according to claim 8, wherein said predetermined time period is substantially immediately after receipt of said at least one signal.

12. The transmitting entity for synchronizing the insertion of data according to claim 8, wherein said at least one signal is a coded sequence of bits.

13. The transmitting entity for synchronizing the insertion of data according to claim 8, wherein said at least one signal is only one signal which is needed to trigger said sending entity to send said data.

14. The transmitting entity according to claim 8, wherein said predetermined time period is a waiting period realized in said transmitting entity.

15. A receiving entity for facilitating insertion by a transmitting entity data synchronized with time moments in a digital data stream, said receiving entity comprises:

a signal generator configured to identify said time moments when it is available for data to fit into said digital data stream, without a request from the transmitting entity, and to generate at least one signal to permit said transmitting entity to send said data after a predetermined time period; and a data receiving entity configured to receive the data sent by said transmitting entity after said predetermined time period, wherein said data is synchronized in the data stream realized in said receiving entity.

16. The receiving entity for inserting data according to claim 15, wherein said data stream is an ADSL data stream.

17. The receiving entity for inserting data according to claim 15, wherein said transmitting entity is an asynchronous transfer mode transmitting entity.

18. The receiving entity for inserting data according to claim 15, wherein said predetermined time period is a waiting period realized in said transmitting entity.

19. The receiving entity for inserting data according to claim 15, wherein said predetermined time period is substantially immediately after receipt of said at least one signal.

20. The receiving entity for inserting data according to claim 15, wherein said at least one signal is a coded sequence of bits.

21. The receiving entity for inserting data according to claim 15, wherein said at least one signal is only one signal which is needed to trigger said transmitting entity to send said data.

* * * * *